United States Patent
Chen

(10) Patent No.: US 11,855,855 B2
(45) Date of Patent: Dec. 26, 2023

(54) NETWORK OPERATION METHOD BASED ON NETWORK FUNCTIONS VIRTUALIZATION DEVICE AND STORAGE MEDIUM

(71) Applicant: ZTE CORPORATION, Shenzhen (CN)

(72) Inventor: Lijuan Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 17/780,944

(22) PCT Filed: Aug. 12, 2020

(86) PCT No.: PCT/CN2020/108582
§ 371 (c)(1),
(2) Date: May 27, 2022

(87) PCT Pub. No.: WO2021/103657
PCT Pub. Date: Jun. 3, 2021

(65) Prior Publication Data
US 2022/0417112 A1  Dec. 29, 2022

(30) Foreign Application Priority Data
Nov. 29, 2019 (CN) .......................... 201911205628.4

(51) Int. Cl.
  G06F 15/177 (2006.01)
  H04L 41/40 (2022.01)
  H04L 41/0873 (2022.01)
(52) U.S. Cl.
  CPC .......... *H04L 41/40* (2022.05); *H04L 41/0873* (2013.01)

(58) Field of Classification Search
  CPC ........ H04L 41/34; H04L 41/342; H04L 41/40
  (Continued)

(56) References Cited

U.S. PATENT DOCUMENTS

2015/0195197 A1   7/2015  Yong et al.
2016/0373297 A1*  12/2016  Ng ...................... H04L 41/0813
(Continued)

FOREIGN PATENT DOCUMENTS

| | | |
|---|---|---|
| CN | 106301829 A | 1/2017 |
| CN | 106921977 A | 7/2017 |

(Continued)

OTHER PUBLICATIONS

Examination report for Indian Patent Application No. 202227036848 dated Oct. 26, 2022 by Intellectual Property India.
(Continued)

*Primary Examiner* — Hee Soo Kim
(74) *Attorney, Agent, or Firm* — Knobbe, Martens, Olson & Bear, LLP

(57) ABSTRACT

Provided are a network operation method and apparatus, a device, and a storage medium. The network operation method includes that a management node receives virtualized network function information carrying at least one dynamic network change flag, where the at least one dynamic network change flag is used for indicating whether a dynamic network change is supported; and that the management node operates on a first-type network according to the virtualized network function information.

20 Claims, 7 Drawing Sheets

(58) Field of Classification Search
USPC .......................................................... 709/220
See application file for complete search history.

(56) References Cited

U.S. PATENT DOCUMENTS

| | | | |
|---|---|---|---|
| 2018/0013586 A1* | 1/2018 | Wang | .................. H04L 41/40 |
| 2019/0068463 A1* | 2/2019 | Li | .................. H04L 41/5051 |
| 2019/0280938 A1 | 9/2019 | Chou et al. | |
| 2022/0231908 A1* | 7/2022 | Blau | .................. H04L 41/40 |

FOREIGN PATENT DOCUMENTS

| | | | | |
|---|---|---|---|---|
| CN | 106998560 A | 8/2017 | | |
| CN | 108092790 A | 5/2018 | | |
| CN | 109995552 A | 7/2019 | | |
| CN | 111092828 A | 5/2020 | | |
| KR | 20170088931 A | 8/2017 | | |
| WO | WO 2016/165292 A1 | 10/2016 | | |
| WO | WO 2017/080391 A1 | 5/2017 | | |
| WO | WO 2017/128820 A1 | 8/2017 | | |
| WO | WO 2017/148326 A1 | 9/2017 | | |
| WO | WO-2019080593 A1 * | 5/2019 | ............ | G06F 9/455 |
| WO | WO 2019/129118 A1 | 7/2019 | | |

OTHER PUBLICATIONS

NGMN Alliance. "Service-Based Architecture in 5G", NGMN Board, Jan. 19, 2018, Section 5.3.
International Search Report for International Application No. PCT/CN2020/108582, dated Nov. 18, 2020.
"Network Functions Virtualisation (NFV) Release 2; Management and Orchestration; Network Service Templates Specification", ETSI GS NFV-IFA 014 V2.5.1, Aug. 31, 2018.
Chinese First Search Report for Chinese Patent Application No. 2019112056284 dated Jul. 26, 2023.
Chinese First Office Action for Chinese Patent Application No. 201911205628.4 dated Jul. 28, 2023.
"Network Functions Virtualisation (NFV); Management and Orchestration" Group Specification, European Telecommunications Standards Institute (ETSI), 650, Route Des Lucioles; F-06921 Sophia-Antipolis; France, vol. 1, NFV Man, No. V1.1.1, Dec. 1, 2014.
Ericsson LM et al., "IFA007ed251 Trunk mode modelling in VnfInfo", ETSI Draft; NFVIFA (18)000358, European Telecommunications Standards Institute (ETSI), 650, Route Des Lucioles, F-06921 Sophia-Antipolis; France, vol. WG NFV IFA Interfaces and Architecture Apr. 19, 2018, pp. 1-4.
Ericsson LM: "Sol003ed311 Support of Trunking", ETSI Draft; NFVSOL (19)000368, European Telecommunications Standards institute (ETSI), 650, Route Des Lucioles; F-06921 Sophia-Antipolis; France, vol. WG NFV SOL Solutions, Jun. 7, 2019, pp. 1-5.
ZTE Corporation: "Discussion paper on supporting trunk", ETSI Draft; NFVIFA (19)000867R2, European Telecommunications Standards institute (ETSI), 650, Route Des Lucioles; F-06921 Sophia-Antipolis; France vol. WG NFV IFA Interfaces and Architecture, Nov. 27, 2019, pp. 1-9.
Request for the Submission of an Opinion for Korean Application No. 10-2022-7021822 dated Oct. 19, 2023.
Extended European Search Report for European Application No. 20893814.2 dated Oct. 26, 2023.

* cited by examiner

NETWORK OPERATION METHOD BASED ON NETWORK FUNCTIONS VIRTUALIZATION DEVICE AND STORAGE MEDIUM

CROSS-REFERENCES TO RELATED APPLICATIONS

This application is a National Stage Application, filed under 35 U.S.C. 371, of International Patent Application No. PCT/CN2020/108582, filed on Aug. 12, 2020, which claims priority to a Chinese patent application No. 201911205628.4 filed with the China National Intellectual Property Administration (CNIPA) on Nov. 29, 2019, the disclosure of which are incorporated herein by reference in their entireties.

TECHNICAL FIELD

The present application relates to the technical field of communication, for example, a network operation method and apparatus, a device, and a storage medium.

BACKGROUND

Network functions virtualization (NFV) is software processing technology that carries other functions by use of general-purpose hardware and virtualization technology and is mainly used to reduce the costs of a network device. The NFV may make the functions of the network device no longer depend on specific-purpose hardware by means of software and hardware decoupling and function abstraction so that resources can be sufficiently and flexibly shared, new services can be rapidly developed and deployed, and automatic deployment, auto scaling, fault isolation and self-healing, and the like are performed based on actual service requirements.

As shown in FIG. 1, the NFV system architecture defined by the European Telecommunications Standards Institute (ETSI) mainly includes an operations support system (OSS)/business support system (BSS), a virtualized network function (VNF), a network functions virtualization infrastructure (NFVI), and a Network Functions Virtualization Management and Orchestration (NFV-MANO) system. The NFVI comprehensively virtualizes hardware resources for computing, storage, and a network and maps the hardware resources into virtual resources. The VNF runs on the NFVI, adopts the virtual resources after virtualization by the NFVI, and implements various conventional physical network functions by use of software. The NFV-MANO manages and orchestrates a relationship between the VNF and the NFVI, a relationship between VNFs, and a relationship between the VNF and another physical network function (PNF).

The NFV-MANO includes a Virtualized Infrastructure Manager (VIM), a Virtualized Network Function Manager (VNFM), and a Network Function Virtualization Orchestrator (NFVO). The VIM is configured to control and manage virtualized resources. The VNFM is configured to manage a life cycle of the VNF. The NFVO is configured to orchestrate and manage a virtual infrastructure and manage a life cycle of a network service (NS).

In a non-virtualized application, ports of a switch may be classified into two types: an access port and a trunk port. As shown in FIG. 2, merely messages belonging to one virtual local area network (VLAN) are allowed to pass through the access port. When the access port is used, if messages need to be exchanged between two switches, different ports on the two switches need to be allocated to messages of different VLANs for separate connections. However, the switch has limited ports and the limited ports of the switch will be wasted in this interconnection manner. However, messages of multiple VLANs are allowed to pass through the trunk port. When the trunk port is used, merely one port is required to allocated to each switch as the trunk port so that the messages of different VLANs can be transmitted, thereby saving ports of the switch.

In a virtualized application, a virtualized switch (vSwitch) of the NFVI can already implement ports which support a trunk mode. As shown in FIG. 3, before the trunk mode is supported, when a virtual machine needs to access multiple networks, the virtual machine needs to be configured with multiple virtual network interface cards (vNICs) to respectively access different networks. In addition, accessed networks may be added or deleted merely in the manner of adding or deleting vNICs. However, changing the vNIC of the virtual machine may trigger a re-instantiation process of the virtual machine itself and the restart of running service software, resulting in the interruption of the VNF. However, after the trunk mode is supported, merely one vNIC needs to be configured for the virtual machine. After the vNIC is connected to a trunk port of the vSwitch, different networks can be accessed through different access ports of the vSwitch, thereby reducing the number of vNICs configured for the virtual machine and providing the virtual machine with the capability to dynamically change a connected network during running of the virtual machine after successful instantiation.

However, in the ETSI NFV specifications, it is merely defined whether external connection points (CPs) of the virtual machine support operation in the trunk mode, that is, whether a port supports the transmission of messages of multiple VLANs. Other issues in the ETSI NFV specifications have not been discussed.

SUMMARY

Embodiments of the present application provide a network operation method. The method includes the following:

A management node receives virtualized network function (VNF) information carrying at least one dynamic network change flag.

The at least one dynamic network change flag is used for indicating whether a dynamic network change is supported.

The management node operates on a first-type network according to the virtualized network function information.

Embodiments of the present application further provide a network operation apparatus including a receiving module and an operation module.

The receiving module is configured to receive virtualized network function information carrying at least one dynamic network change flag.

The at least one dynamic network change flag is used for indicating whether a dynamic network change is supported.

The operation module is configured to operate on a first-type network according to the virtualized network function information.

Embodiments of the present application further provide a management node device.

The management node device includes a memory, a processor, and a computer program stored in the memory and executable by the processor. When executing the computer program, the processor implements the network operation method according to the embodiments of the present application.

Embodiments of the present application further provide a computer-readable storage medium storing a computer program which, when executed by a processor, implements the network operation method according to the embodiments of the present application.

DETAILED DESCRIPTION

Embodiments of the present application are described below in conjunction with drawings.

In addition, in the embodiments of the present application, the words such as "optionally" or "for example" refer to that an example, an instance, or an illustration is provided.

To understand solutions provided in the embodiments of the present application, related concepts which may be involved in the embodiments of the present application are explained and described herein. An example is provided below.

A virtual machine provides the capability to dynamically change an accessed network. This capability is not equivalent to the capability of a virtualized switch connected to the virtual machine to dynamically create or delete an access port. This capability indicates that service software running on the virtual machine needs to process dynamically changing data streams from different networks, that is, the service software running on the virtual machine is required to have a data processing capability matching the accessed network. Otherwise, the function of dynamically changing the accessed network in a trunk mode in a virtualized environment is incompletely implemented.

Figure 1:
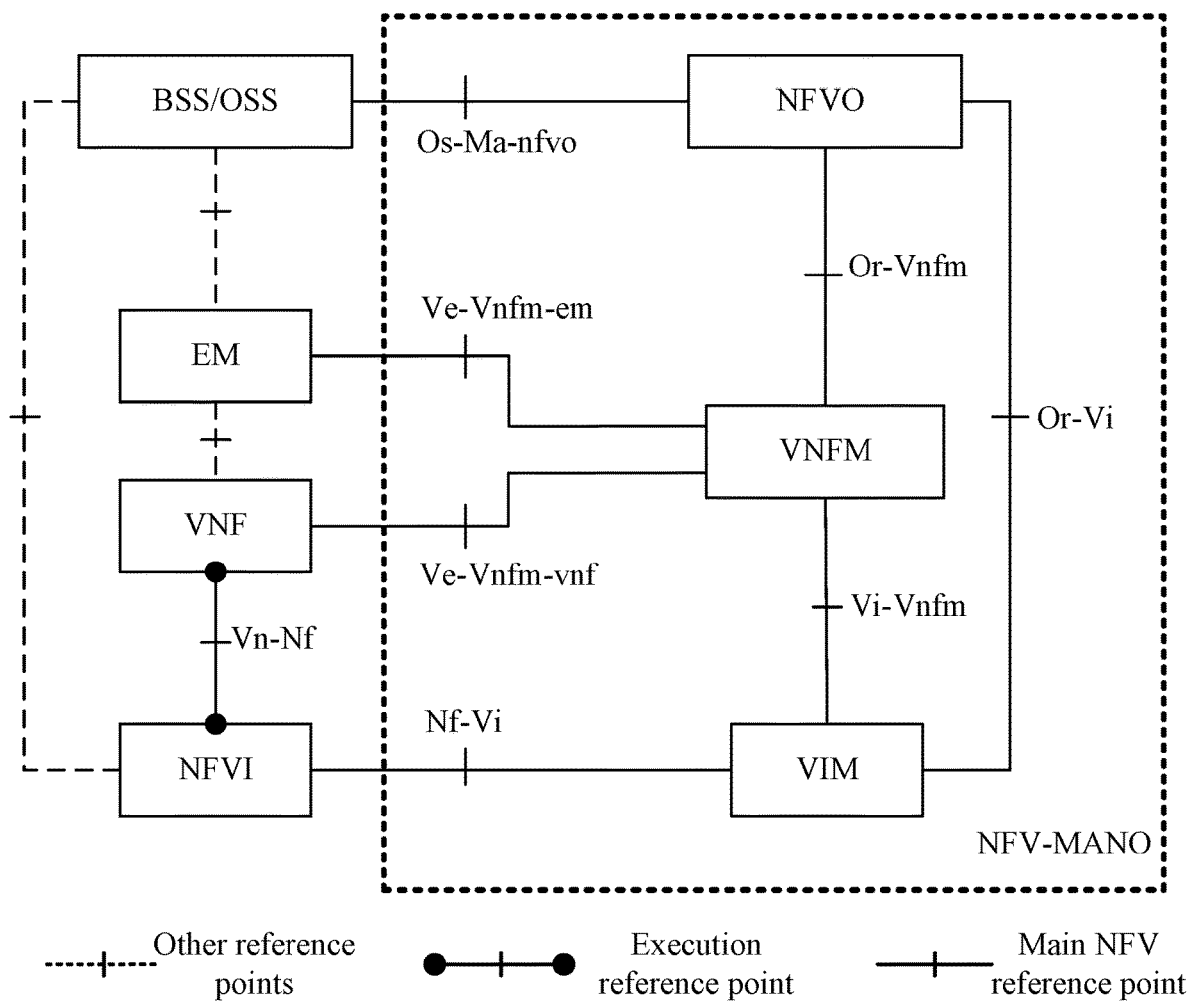
FIG. 1 is a diagram of an ETSI NFV system architecture.
Figure 2:
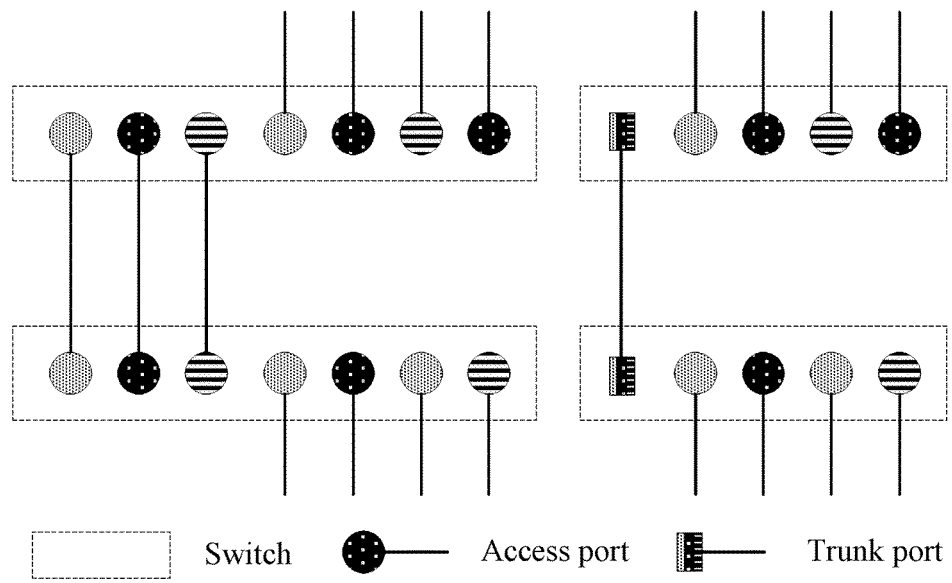
FIG. 2 is a comparison diagram of an access port and a trunk port in a non-virtualized environment.
Figure 3:
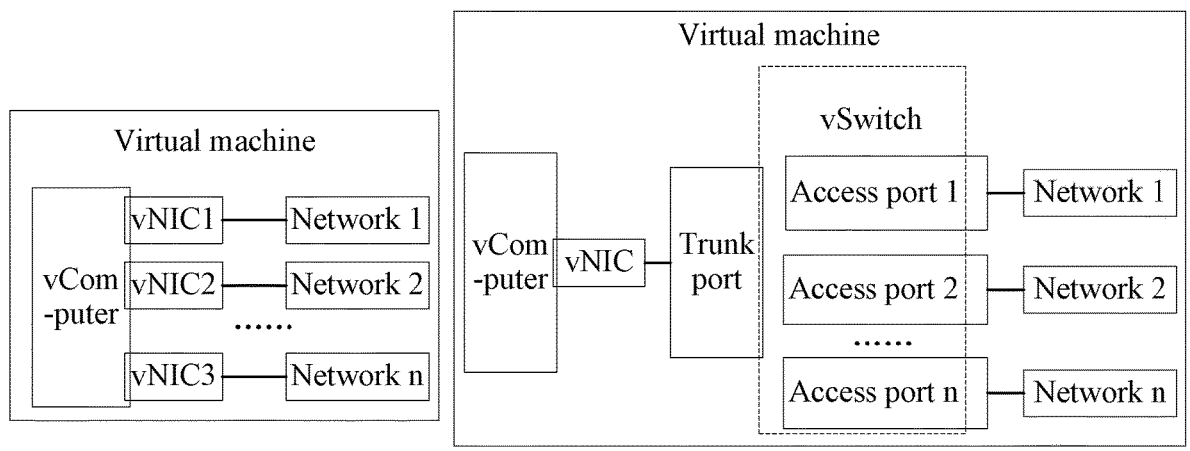
FIG. 3 is a comparison diagram of a virtual machine which uses a trunk mode and a virtual machine which does not use the trunk mode.
Figure 4:
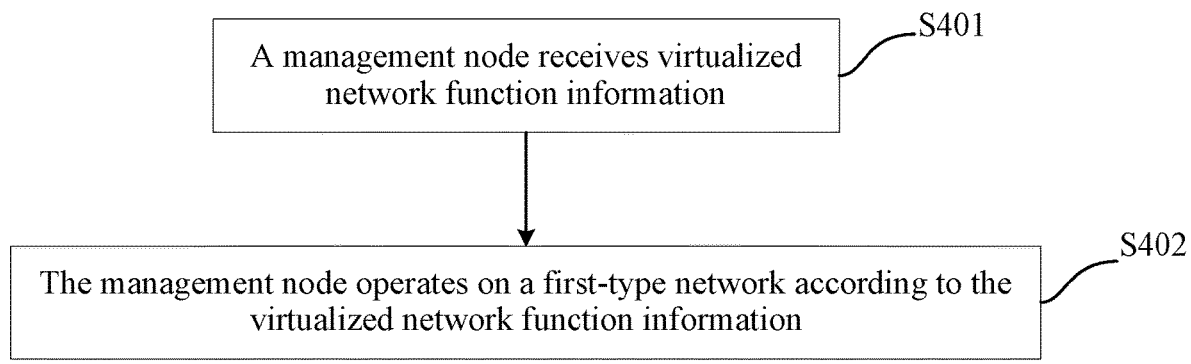
FIG. 4 is a flowchart of a network operation method according to an embodiment.

Based on the preceding concept, FIG. 4 is a flowchart of a network operation method according to an embodiment. The method is applicable to the scenario in which the trunk mode is supported in the virtualized environment. As shown in FIG. 4, the method may include the following:

In S401, a management node receives virtualized network function information.

Figure 5:
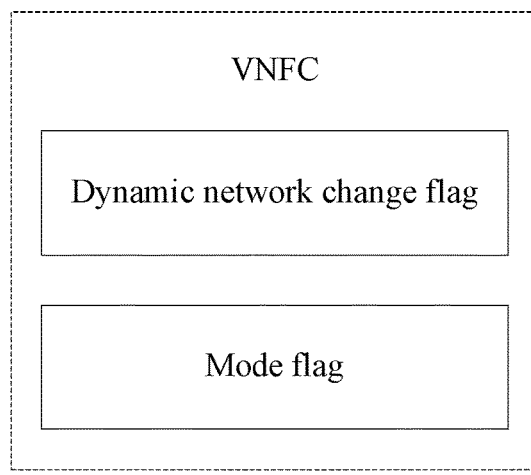
FIG. 5 is a structure diagram of virtualized network function information.

In this embodiment, the virtualized network function information may carry at least one dynamic network change flag. As shown in FIG. 5, the dynamic network change flag can explicitly indicate in the trunk mode whether the service software currently supports the processing of a data stream change caused by a dynamic network change.

For example, it is assumed that when the dynamic network change flag is 0 or false, it indicates that the service software does not support a data stream change caused by a network change and the management node cannot initiate a change to an accessed network. When the dynamic network change flag is 1 or true, it indicates that the service software supports the data stream change caused by the network change and the management node can initiate the change to the accessed network.

In S402, the management node operates on a first-type network according to the virtualized network function information.

The first-type network in S402 may be a network created by MANO according to a network attribute defined in the ETSI NFV specifications. The network attribute may be a description of a network attribute which is described in a virtualized network function descriptor (VNFD) and supported by a VNF and a network attribute which is in a network service descriptor (NSD) and describes the interconnection between a VNF instance and another VNF\PNF, or a related parameter of a network which is added by a network management node and connected to a virtualized network function instance, for example, a related parameter of a network which is added by an OSS/BSS of the network management node in an NSD design phase and connected to the virtualized network function instance.

After acquiring the at least one dynamic network change flag carried in the virtualized network function information, the management node may operate on a created first-type network.

The preceding first-type network may be one or more networks. That is, two or more networks created according to the network attribute defined in the ETSI NFV specifications may be collectively referred to as first-type networks.

In the embodiments of the present application, after receiving the virtualized network function information, the management node operates on the first-type network according to the virtualized network function information. Since the at least one dynamic network change flag carried in the virtualized network function information can be used for indicating whether the dynamic network change is supported, the management node can correctly process a change requirement of the first-type network according to the virtualized network function information.

In an example, the virtualized network function information received in S401 may carry at least one mode flag used for indicating whether the trunk mode is supported. The virtualized network function information may also carry a restriction characteristic parameter for a network connection, where the parameter may be the number of access ports, the type of the first-type network (for example, a virtual local area network (VLAN), a Virtual eXtensible Local Area Network (VXLAN), or the Generic Routing Encapsulation (GRE)), a protocol stack structure of the accessed network (for example, media access control (MAC)\the Internet Protocol (IP)\the User Datagram Protocol (UDP), or the MAC\IP\Transmission Control Protocol (TCP)).

In an example, the preceding S402 may be that the network management node creates a virtualized network function instance according to the virtualized network function information and connects the first-type network according to the virtualized network function instance. Further, when the first-type network runs, the network management node operates on a connection relationship between the virtualized network function instance and the first-type network according to the at least one dynamic network change flag.

The network management node in this application refers to the management node and may include the OSS/BSS and the MANO. The network management node may include other units and modules, which is not limited in the embodiments of the present application.

After the network management node receives the virtualized network function information, the OSS/BSS may manage the virtualized network function information as part of the NSD or manage the virtualized network function information independently. Optionally, the OSS/BSS may carry acquired network connection information in the NSD. Further, the OSS/BSS uploads the virtualized network function information to the MANO so that the MANO instantiates the virtualized network function instance according to the virtualized network function information.

The uploading of the virtualized network function information by the OSS/BSS to the MANO in the preceding description may be part of an operation of uploading the NSD or may be an independent management operation of the virtualized network function information.

The instantiation process may be that the MANO creates a vSwitch, where a trunk port of the vSwitch is connected to the virtualized network function instance. Further, the MANO connects the virtualized network function instance to the first-type network, and the OSS/BSS and the MANO record the dynamic network change flag in the virtualized network function information. If a network needs to be added, the MANO creates a required access port to be connected to the network. The required access port is created according to the restriction characteristic parameter for the network connection in the virtualized network function information.

Optionally, that the network management node operates on the connection relationship between the virtualized network function instance and the first-type network according to the at least one dynamic network change flag may be that the network management node operates on the connection relationship between the virtualized network function instance and the first-type network according to a dynamic network change flag of at least one connection module.

The connection relationship between the virtualized network function instance and the first-type network may be a relationship that the virtualized network function instance is connected to the first-type network through the connection module.

The connection module may include a VNF module and/or a virtualized network function component (VNFC) and/or a CP. As shown in FIG. 5, the VNF module may consist of one or more VNFCs, and one VNFC may be connected to one or more CPs connected to the trunk port of the vSwitch.

The preceding at least one dynamic network change flag may be added to a connection point descriptor (CPD) in the ETSI specifications. Therefore, the management node may operate, at least through the dynamic network change flag, on the connection relationship between the virtualized network function instance and the first-type network which are connected through the CP.

In an example, the network management node may operate on the connection relationship between the virtualized network function instance and the first-type network according to the dynamic network change flag of the at least one connection module in implementation manners described below.

In manner one, when the dynamic network change flag of the connection module indicates that the dynamic network change is not supported, the network management node does not change the connection relationship between the virtualized network function instance and the first-type network.

In manner two, when the dynamic network change flag of the connection module indicates that the dynamic network change is supported, the network management node changes the connection relationship between the virtualized network function instance and the first-type network.

In manner three, when the dynamic network change flag of the connection module indicates that the dynamic network change is supported, and the virtualized network function information satisfies a preset condition, the network management node does not change the connection relationship between the virtualized network function instance and the first-type network.

Figure 6:
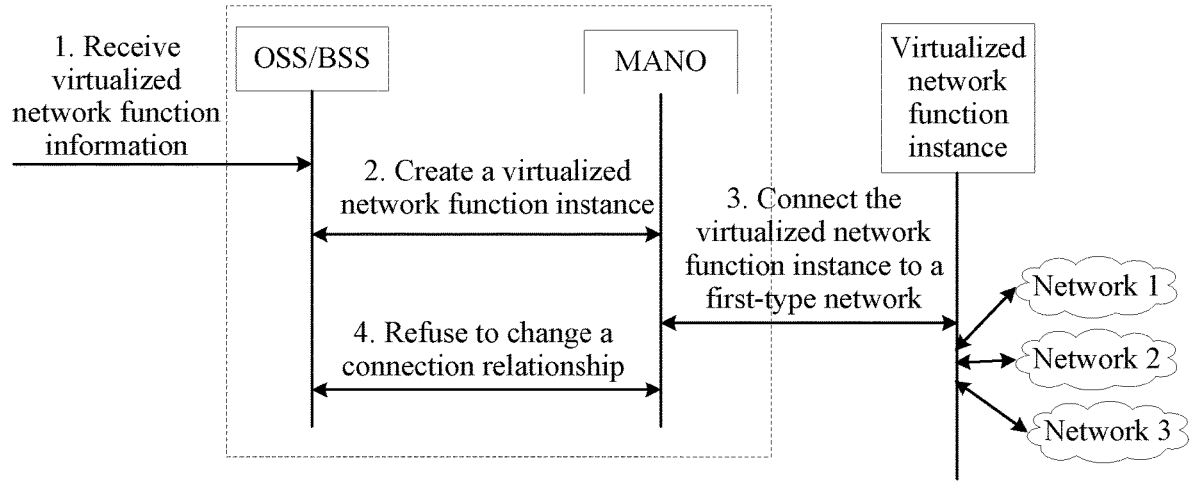
FIG. 6 is a flowchart of a network operation method according to an embodiment.

As shown in FIG. 6, in the preceding manner one, it is assumed that in a running environment, the VNF module needs to support the connections of multiple first-type networks, the mode flag carried in the virtualized network function information indicates that the trunk mode is supported, that is, the first-type networks may be connected through access ports of the vSwitch, and a dynamic network change flag of the virtualized network function instance indicates that the dynamic network change is not supported.

Then, during the running of the first-type network, after receiving the virtualized network function information, the network management node does not change the connection relationship between the virtualized network function instance and the first-type network, that is, the network management node refuses to modify connection relationships between the virtualized network function instance and network 1, network 2, . . . , and network n.

For example, the preceding change operation on the connection relationship between the virtualized network function instance and the first-type network may exceed limitations to the support capabilities of the service software set in the virtualized network function module. For example, the number of access ports limited by the virtualized network function module is exceeded, an attribute of a network connected through an access port is changed, or the like.

In the preceding manner two, the network management node may change the connection relationship between the virtualized network function instance and the first-type network in cases described below.

Figure 7:
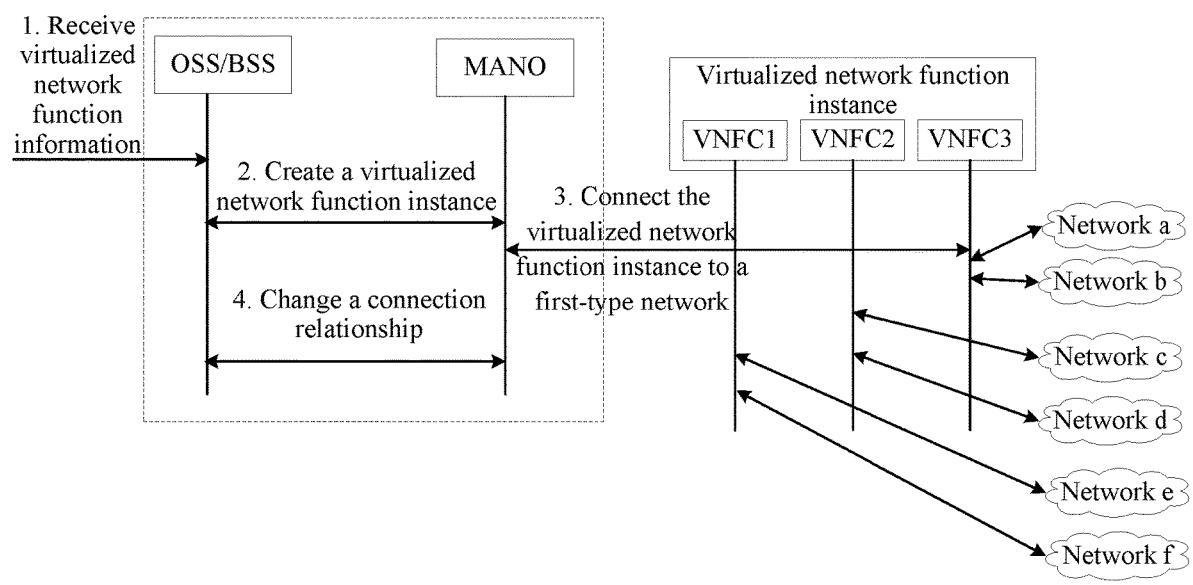
FIG. 7 is a flowchart of another network operation method according to an embodiment.

As shown in FIG. 7, in an example, it is assumed that the VNF consists of three VNFCs, that is, VNFC1, VNFC2, and VNFC3, respectively, first-type networks connected to VNFC1 are network e and network f, first-type networks connected to VNFC2 are network c and network d, and first-type networks connected to VNFC3 are network a and network b. Mode flags for VNFC1 and VNFC2 indicate that the trunk mode is supported. A mode flag for VNFC3 indicates that the trunk mode is not supported. In addition, a dynamic network change flag for VNFC1 indicates that the dynamic change is supported and a dynamic network change flag for VNFC2 indicates that the dynamic change is not supported. That is, VNFC1 and VNFC2 may be connected to network e and network f and network c and network d through the access ports of the vSwitch, respectively; and VNFC3 is connected to network a and network b through multiple virtual networks.

Then, after receiving the virtualized network function information, the management node may learn that VNFC1 uses the trunk mode and supports the dynamic network change; VNFC2 uses the trunk mode and does not support the dynamic network change; and VNFC3 does not use the trunk mode.

Further, during the running of the first-type networks a to f, when receiving a network change request, the network management node may learn, according to the virtualized network function information, that a network change operation can be performed merely on VNFC1 which supports the dynamic network change, that is, connection relationships between VNFC1 and the first-type networks e and f are changed. For example, network g is added to VNFC1, network e is deleted, or the like.

Figure 8:
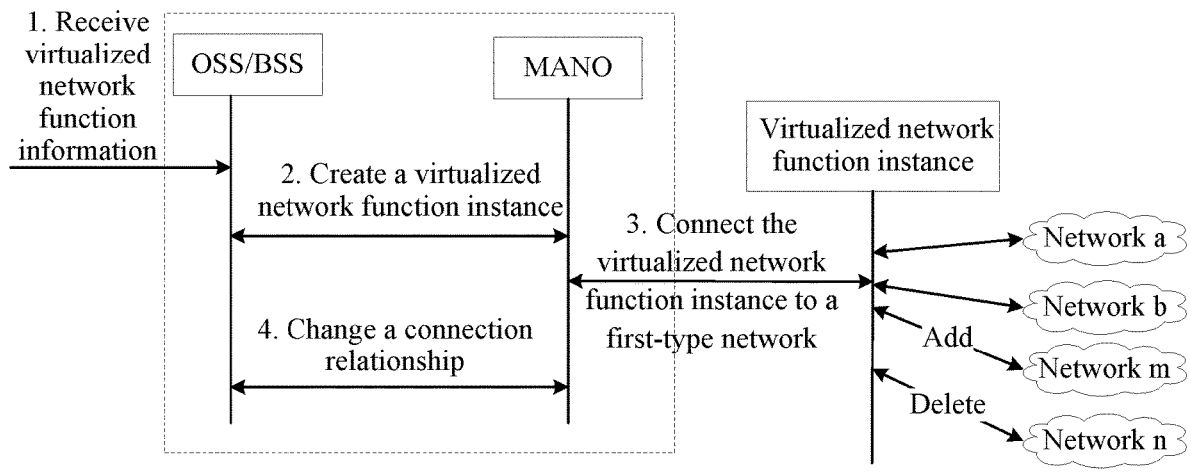
FIG. 8 is a flowchart of another network operation method according to an embodiment.

As shown in FIG. 8, in another example, it is assumed that in the running environment, the VNF module needs to support the connections of multiple networks, information about the connected networks is changeable, the mode flag carried in the virtualized network function information indicates that the trunk mode is supported, that is, the first-type network can be connected through the access port of the vSwitch, and at least one dynamic network change flag indicates that the dynamic network change is supported.

Then, during the running of the first-type network, when receiving the network change request, the network management node changes the connection relationship between the virtualized network function instance and the first-type network.

For example, operation and maintenance personnel add a requirement for connecting the virtualized network function instance to network m. After receiving the network change request, the network management node may initiate an instruction to add a new network connection through the OSS/BSS within the network management node so that the OSS/BSS and the MANO cooperate with each other to create a new access port on the vSwitch connected to the virtualized network function instance, connect the access port to network m, and notify service processing software of the virtualized network function instance of related parameters of network m.

The preceding network m may be a network already created or may be a network specially created for a virtual network instance.

Alternatively, the operation and maintenance personnel design as required that the virtualized network function instance no longer processes data on network n. Then, after receiving the network change request, the network management node may initiate an instruction to delete a network connection through the OSS/BSS within the network management node so that the OSS/BSS and the MANO cooperate with each other to break a connection between the virtualized network function instance and network n, delete a corresponding access port on the vSwitch connected to the virtualized network function module, and notify the service processing software of the virtualized network function instance that network n is not within the processing range of the service processing software.

Figure 9:
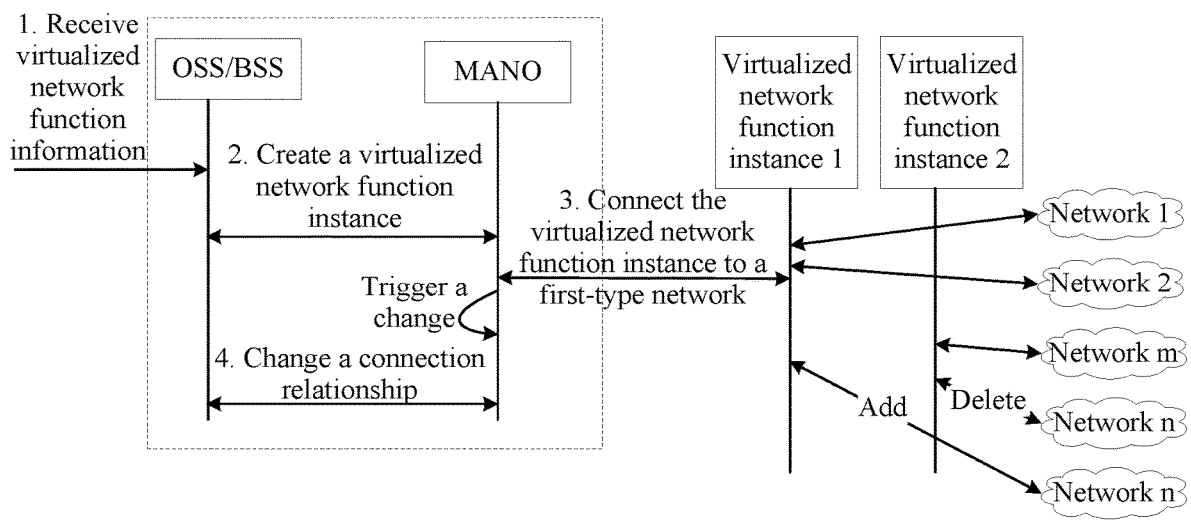
FIG. 9 is a flowchart of another network operation method according to an embodiment.

As shown in FIG. 9, in an example, it is assumed that in the running environment, the VNF module needs to support the connections of multiple networks, virtualized network function instance 1 is connected to network 1 and network 2, virtualized network function instance 2 is connected to network n and network m, the information about the connected networks are changeable, the mode flag carried in the virtualized network function information indicates that the trunk mode is supported, that is, the first-type network may be connected through the access port of the vSwitch, and at least one dynamic network change flag indicates that the dynamic network change is supported.

Then, during the running of the first-type network, when a network data stream satisfies a trigger condition, the network management node changes the connection relationship between the virtualized network function instance and the first-type network.

For example, when the MANO in the network management node detects during orchestration and management that the network data stream satisfies the trigger condition and virtualized network function instance 1 needs to take over a data stream of network n, the OSS/BSS and the MANO cooperate with each other to perform the following process: a connection between virtualized network function instance 2 and network n is broken; an access port of the vSwitch for virtualized network function instance 2 is deleted; service processing software of virtualized network function instance 2 is notified that network n is not within the processing range of the service processing software; a new access port is created on a vSwitch connected to virtualized network function instance 1 and then connected to network n; and service processing software of virtualized network function instance 1 is notified of related parameters of network n, thereby changing the connection relationship between network n and virtualized network function instance 2.

For example, in the preceding process, the trigger condition satisfied by the network data stream may be that a running overhead of virtualized network function instance 2 is overloaded and the data stream needs to be distributed to virtualized network function instance 1 with a low running overhead, that a fault occurs during the running of virtualized network function instance 2 and the data stream is distributed to virtualized network function instance 1 which normally runs so as to ensure that a service is not affected, or that both virtualized network function instance 1 and virtualized network function instance 2 are running with low loads, a dynamic capacity expansion management module in the management node determines to reduce a capacity of virtualized network function instance 2, and the data stream on virtualized network function instance 2 is distributed to virtualized network function instance 1.

The preceding trigger condition is merely for an illustrative description. If other trigger conditions are satisfied, the change of the connection relationship between the virtualized network function instance and the first-type network by the example process shown in FIG. 9 is within the scope of the present application.

Figure 10:
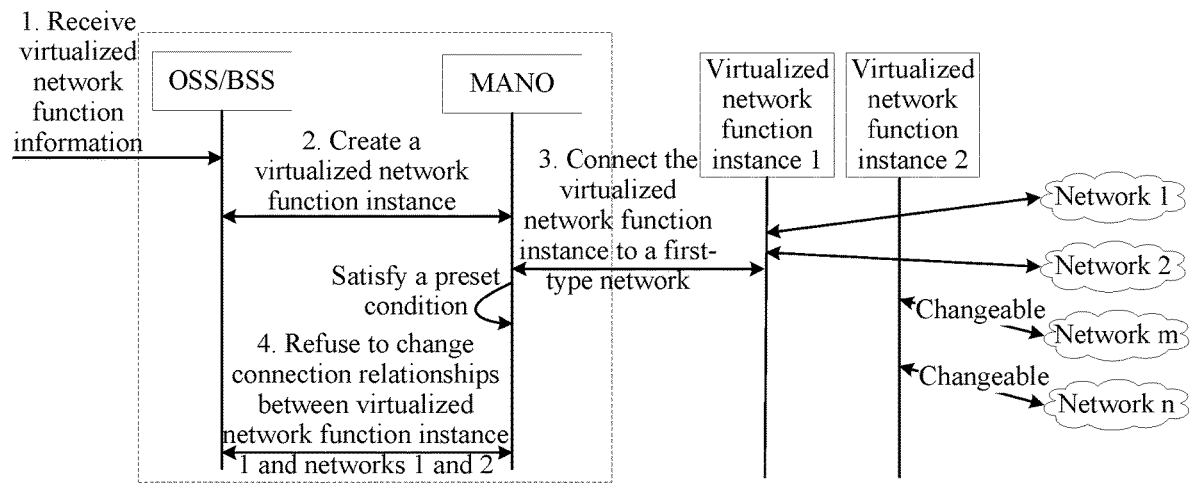
FIG. 10 is a flowchart of another network operation method according to an embodiment.

As shown in FIG. 10, in manner three, it is assumed that in the running environment, the VNF module needs to support the connections of multiple networks, virtualized network function instance 1 is connected to network 1 and network 2, virtualized network function instance 2 is connected to network n and network m, the information about the connected networks are changeable, the mode flag carried in the virtualized network function information indicates that the trunk mode is supported, that is, the first-type network may be connected through the access port of the vSwitch, and at least one dynamic network change flag indicates that the dynamic network change is supported.

Then, during the running of network 1, network 2, network n, and network m, when the dynamic network change flag for the virtualized network function instance indicates that the dynamic network change is supported and the virtualized network function information satisfies the preset condition, the network management node does not change the connection relationship between the virtualized network function instance and the first-type network.

For example, though the dynamic network change flag of virtualized network function instance 1 indicates that the dynamic network change is supported, the network management node does not change connection relationships between virtualized network function instance 1 and network 1 and network 2 when the virtualized network function information is designed to be that information for virtualized network function instance 1 satisfies the preset condition (for example, a first-type network with a high priority is connected to virtualized network function instance 1, or a user with a high priority accesses a first-type network connected to virtualized network function instance 1).

In this case, when the operation and maintenance personnel initiate the network change request, the OSS/BSS determines that the connection relationships between virtualized network function instance 1 and network 1 and network 2 are not changed while merely connection relationships between virtualized network function instance 2 and network n and network m are allowed to be changed. That is, during the orchestration and management by the MANO, a triggered network change can be performed merely on virtualized network function instance 2. For example, the network change is implemented through the addition or deletion of an access port on the vSwitch.

The preceding preset conditions are merely for an illustrative description and are not limited in the embodiments of the present application.

Figure 11:
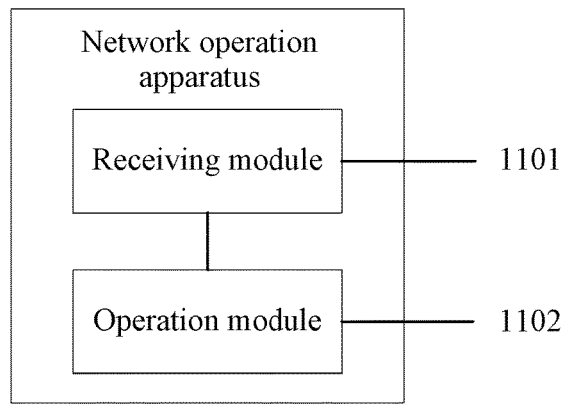
FIG. 11 is a structure diagram of a network operation apparatus according to an embodiment.

FIG. 11 is a structure diagram of a network operation apparatus according to an embodiment. As shown in FIG. 11, the apparatus includes a receiving module 1101 and an operation module 1102. The receiving module is configured to receive virtualized network function information which carries at least one dynamic network change flag. The at least one dynamic network change flag is used for indicating whether a dynamic network change is supported.

The operation module is configured to operate on a first-type network according to the virtualized network function information.

The preceding operation module includes a creation unit, a connection unit, and an operation unit. The creation unit is configured to create a virtualized network function instance according to the virtualized network function information. The connection unit is configured to connect the first-type network according to the virtualized network function instance. The operation unit is configured to operate on a connection relationship between the virtualized network function instance and the first-type network according to the at least one dynamic network change flag when the first-type network runs.

The preceding operation unit may be specifically configured to operate on the connection relationship between the virtualized network function instance and the first-type network according to a dynamic network change flag of at least one connection module. The virtualized network function instance is connected to the first-type network through the connection module, and the connection module includes a virtualized network function module and/or a virtualized network function component and/or a connection point.

When the dynamic network change flag of the connection module indicates that the dynamic network change is not supported, the operation unit is configured to not change the connection relationship between the virtualized network function instance and the first-type network. Alternatively, when the dynamic network change flag of the connection module indicates that the dynamic network change is supported, the operation unit is configured to change the connection relationship between the virtualized network function instance and the first-type network.

In an example, that the operation unit is configured to change the connection relationship between the virtualized network function instance and the first-type network may be that the operation unit changes the connection relationship between the virtualized network function instance and the first-type network when the network operation apparatus receives a network change request.

In an example, that the operation unit is configured to change the connection relationship between the virtualized network function instance and the first-type network may be that the operation unit changes the connection relationship between the virtualized network function instance and the first-type network when a network data stream satisfies a trigger condition.

In an example, when the dynamic network change flag of the connection module indicates that the dynamic network change is supported and the virtualized network function information satisfies a preset condition, the operation unit is configured to not change the connection relationship between the virtualized network function instance and the first-type network.

Figure 12:
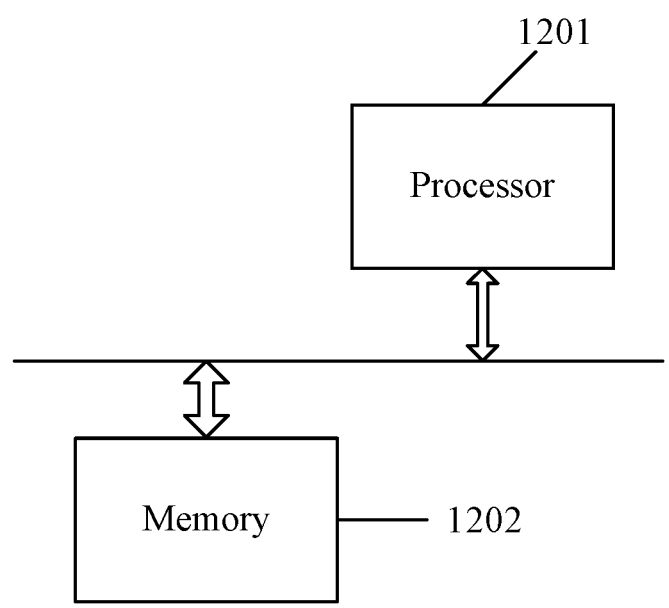
FIG. 12 is a structure diagram of a management node device according to an embodiment.

FIG. 12 is a structure diagram of a management node device according to an embodiment. As shown in FIG. 12, the device includes a processor 1201 and a memory 1202. One or more processors 1201 may be in the device, and one processor 1201 is shown as an example in FIG. 12. The processor 1201 and the memory 1202 in the device may be connected through a bus or in other manners. In FIG. 12, the connection through the bus is shown as an example.

The memory 1202, as a computer-readable storage medium, may be configured to store software programs, computer-executable programs, and modules, such as program instructions/modules corresponding to the network operation method in the embodiment of the present application in FIG. 4 (for example, the receiving module 1101 and the operation module 1102 in the network operation apparatus). The processor 1201 executes software programs, instructions, and modules stored in the memory 1202 so that the preceding network operation method is implemented.

The memory 1202 may mainly include a program storage region and a data storage region. The program storage region may store an operating system and an application program required for at least one function, and the data storage region may store data or the like created according to the use of the device. In addition, the memory 1202 may include a high-speed random-access memory and may also include a non-volatile memory such as at least one magnetic disk memory, a flash memory, or another non-volatile solid-state memory.

An embodiment of the present application further provides a storage medium including computer-executable instructions which are used for performing a network operation method when executed by a computer processor. The method includes the following:

A management node receives virtualized network function information carrying at least one dynamic network change flag. The at least one dynamic network change flag is used for indicating whether a dynamic network change is supported. The management node operates on a first-type network according to the virtualized network function information.

The above are merely example embodiments of the present application and are not intended to limit the scope of the present application.

Generally, various embodiments of the present application may be implemented in hardware, a dedicated circuit, software, logics, or any combination thereof. For example, some aspects may be implemented in hardware while other aspects may be implemented in firmware or software executable by a controller, a microprocessor, or other computing devices, although the present application is not limited thereto.

The embodiments of the present application may be implemented through the execution of computer program instructions by a data processor of a network operation apparatus, for example, implemented in a processor entity, hardware, or a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program steps, or may represent interconnected logic circuits, modules, and functions, or may represent a combination of program steps and logic circuits, modules, and functions. Computer programs may be stored on a memory. The memory may be of any type suitable for a local technical environment and may be implemented using any suitable data storage technology, such as, but not limited to, a read-only memory (ROM), a random-access memory (RAM), and an optical memory device and system (digital video disc (DVD) or compact disc (CD)). Computer-readable media may include non-transitory storage media. The data processor may be of any type suitable for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on multi-core processor architecture.

What is claimed is:

1. A network operation method, comprising:
    receiving, by a management node, virtualized network function information carrying at least one dynamic network change flag, wherein the at least one dynamic network change flag is used for indicating whether a dynamic network change is supported and, in a trunk mode, explicitly indicating whether service software which runs on a virtual machine currently supports processing of a data stream change caused by the dynamic network change; and
    operating, by the management node, on a first-type network according to the virtualized network function information.

2. The method according to claim 1, wherein operating, by the management node, on the first-type network according to the virtualized network function information comprises:
    creating, by the management node, a virtualized network function instance according to the virtualized network function information; and
    connecting, by the management node, the first-type network to the virtualized network function instance according to the virtualized network function information.

3. The method according to claim 2, wherein operating, by the management node, on the first-type network according to the virtualized network function information comprises:
    in a case where the first-type network runs, operating, by the management node, on a connection relationship between the virtualized network function instance and the first-type network according to the at least one dynamic network change flag.

4. The method according to claim 3, wherein operating, by the management node, on the connection relationship between the virtualized network function instance and the first-type network according to the at least one dynamic network change flag comprises:
    operating, by the management node, on the connection relationship between the virtualized network function instance and the first-type network according to a dynamic network change flag of at least one connection module;
    wherein the virtualized network function instance is connected to the first-type network through the connection module; and
    the connection module comprises at least one of a virtualized network function module, a virtualized network function component (VNFC), or a connection point (CP).

5. The method according to claim 4, wherein operating, by the management node, on the connection relationship between the virtualized network function instance and the first-type network according to the dynamic network change flag of the at least one connection module comprises:
    in a case where the dynamic network change flag of the connection module indicates that the dynamic network change is not supported, not changing, by the management node, the connection relationship between the virtualized network function instance and the first-type network; or
    in a case where the dynamic network change flag of the connection module indicates that the dynamic network change is supported, changing, by the management node, the connection relationship between the virtualized network function instance and the first-type network.

6. The method according to claim 5, wherein changing, by the management node, the connection relationship between the virtualized network function instance and the first-type network comprises:
    in a case where the management node receives a network change request, changing, by the management node, the connection relationship between the virtualized network function instance and the first-type network; or
    in a case where a network data stream satisfies a trigger condition, changing, by the management node, the connection relationship between the virtualized network function instance and the first-type network.

7. The method according to claim 4, wherein operating, by the management node, on the connection relationship between the virtualized network function instance and the first-type network according to the dynamic network change flag of the at least one connection module comprises:
    in a case where the dynamic network change flag of the connection module indicates that the dynamic network change is supported and the virtualized network function information satisfies a preset condition, not changing, by the management node, the connection relationship between the virtualized network function instance and the first-type network.

8. The method according to claim 1, wherein operating, by the management node, on the first-type network according to the virtualized network function information comprises:

in a case where the first-type network runs, operating, by the management node, on a connection relationship between the virtualized network function instance and the first-type network according to the at least one dynamic network change flag.

9. The method according to claim 8, wherein operating, by the management node, on the connection relationship between the virtualized network function instance and the first-type network according to the at least one dynamic network change flag comprises:

operating, by the management node, on the connection relationship between the virtualized network function instance and the first-type network according to a dynamic network change flag of at least one connection module;

wherein the virtualized network function instance is connected to the first-type network through the connection module; and the connection module comprises at least one of a virtualized network function module, a virtualized network function component (VNFC), or a connection point (CP).

10. The method according to claim 9, wherein operating, by the management node, on the connection relationship between the virtualized network function instance and the first-type network according to the dynamic network change flag of the at least one connection module comprises:

in a case where the dynamic network change flag of the connection module indicates that the dynamic network change is not supported, not changing, by the management node, the connection relationship between the virtualized network function instance and the first-type network; or in a case where the dynamic network change flag of the connection module indicates that the dynamic network change is supported, changing, by the management node, the connection relationship between the virtualized network function instance and the first-type network.

11. The method according to claim 10, wherein changing, by the management node, the connection relationship between the virtualized network function instance and the first-type network comprises:

in a case where the management node receives a network change request, changing, by the management node, the connection relationship between the virtualized network function instance and the first-type network; or in a case where a network data stream satisfies a trigger condition, changing, by the management node, the connection relationship between the virtualized network function instance and the first-type network.

12. The method according to claim 9, wherein operating, by the management node, on the connection relationship between the virtualized network function instance and the first-type network according to the dynamic network change flag of the at least one connection module comprises:

in a case where the dynamic network change flag of the connection module indicates that the dynamic network change is supported and the virtualized network function information satisfies a preset condition, not changing, by the management node, the connection relationship between the virtualized network function instance and the first-type network.

13. A management node device, comprising:

a memory, a processor, and a computer program stored in the memory and executable by the processor, wherein when executing the computer program, the processor implements the following:

receiving, by a management node, virtualized network function information carrying at least one dynamic network change flag, wherein the at least one dynamic network change flag is used for indicating whether a dynamic network change is supported and, in a trunk mode, explicitly indicating whether service software which runs on a virtual machine currently supports processing of a data stream change caused by the dynamic network change; and operating, by the management node, on a first-type network according to the virtualized network function information.

14. The device according to claim 13, wherein operating, by the management node, on the first-type network according to the virtualized network function information comprises:

creating, by the management node, a virtualized network function instance according to the virtualized network function information; and connecting, by the management node, the first-type network to the virtualized network function instance according to the virtualized network function information.

15. The device according to claim 13, wherein operating, by the management node, on the first-type network according to the virtualized network function information comprises:

in a case where the first-type network runs, operating, by the management node, on a connection relationship between the virtualized network function instance and the first-type network according to the at least one dynamic network change flag.

16. The device according to claim 15, wherein operating, by the management node, on the connection relationship between the virtualized network function instance and the first-type network according to the at least one dynamic network change flag comprises:

operating, by the management node, on the connection relationship between the virtualized network function instance and the first-type network according to a dynamic network change flag of at least one connection module;

wherein the virtualized network function instance is connected to the first-type network through the connection module; and the connection module comprises at least one of a virtualized network function module, a virtualized network function component (VNFC), or a connection point (CP).

17. The device according to claim 16, wherein operating, by the management node, on the connection relationship between the virtualized network function instance and the first-type network according to the dynamic network change flag of the at least one connection module comprises:

in a case where the dynamic network change flag of the connection module indicates that the dynamic network change is not supported, not changing, by the management node, the connection relationship between the virtualized network function instance and the first-type network; or in a case where the dynamic network change flag of the connection module indicates that the dynamic network change is supported, changing, by the management node, the connection relationship between the virtualized network function instance and the first-type network.

18. The device according to claim 17, wherein changing, by the management node, the connection relationship between the virtualized network function instance and the first-type network comprises:
  in a case where the management node receives a network change request, changing, by the management node, the connection relationship between the virtualized network function instance and the first-type network; or
  in a case where a network data stream satisfies a trigger condition, changing, by the management node, the connection relationship between the virtualized network function instance and the first-type network.

19. The device according to claim 16, wherein operating, by the management node, on the connection relationship between the virtualized network function instance and the first-type network according to the dynamic network change flag of the at least one connection module comprises:
  in a case where the dynamic network change flag of the connection module indicates that the dynamic network change is supported and the virtualized network function information satisfies a preset condition, not changing, by the management node, the connection relationship between the virtualized network function instance and the first-type network.

20. A non-transitory computer-readable storage medium, which is configured to store a computer program which, when executed by a processor, implements the following:
  receiving, by a management node, virtualized network function information carrying at least one dynamic network change flag, wherein the at least one dynamic network change flag is used for indicating whether a dynamic network change is supported and, in a trunk mode, explicitly indicating whether service software which runs on a virtual machine currently supports processing of a data stream change caused by the dynamic network change; and
  operating, by the management node, on a first-type network according to the virtualized network function information.

* * * * *